Figure 1:
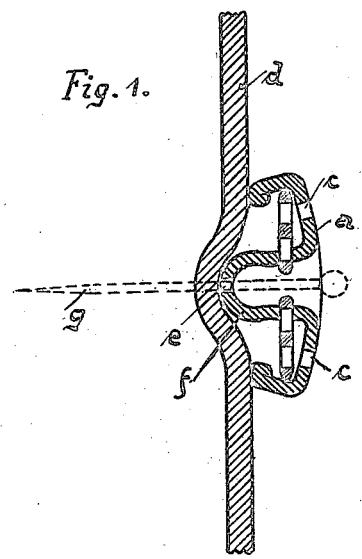

Mar. 20, 1923.

E. A. BAIL.
SNAP FASTENER.
FILED AUG. 29, 1921.

1,449,080.

INVENTOR
EMIL AUGUST BAIL
BY
Baldwin & Wright,
ATTORNEYS.

Patented Mar. 20, 1923.

1,449,080

UNITED STATES PATENT OFFICE.

EMIL AUGUST BAIL, OF LAUSA, NEAR DRESDEN, GERMANY, ASSIGNOR TO WALDES & CO. INC., OF NEW YORK, N. Y.

SNAP FASTENER.

Application filed August 29, 1921. Serial No. 496,543.

*To all whom it may concern:*

Be it known that I, EMIL AUGUST BAIL, a subject of the Republic of Saxony, German Republic, and a resident of Lausa, near Dresden, Republic of Saxony, German Republic, have invented new and useful Improvements in Snap Fasteners, of which the following is a specification.

The invention relates to garment fastening devices generally of the type known as snap fasteners and consisting as a rule of interlocking male and female members, the male element being ordinarily provided with a rounded projection or ball which fits within a correspondingly shaped socket in the female member. The nature of the improvement resides in the provision of an aperture centrally located in the ball of the male part of the fastener and preferably also a corresponding aperture in the center of the female part of the fastener for the purpose of enabling a needle or equivalent device to be passed through said apertures to center definitely the opposed member of the fastener with respect to its corresponding member.

In sewing on snap fasteners, a known drawback is that the place fixed in advance for the stud and socket respectively of the snap fastener is rarely reached or ensured. The consequence of this fact is that the edges of the stuff or cloth laid one above another are distorted or contracted, said distortion being caused by the mutual wrong position of the parts of the snap fastener, whereby the stuff or cloth is stretched or strained. It frequently happens that snap fasteners arranged in a wrong manner injure the good fit of a dress even though it be otherwise well finished.

Two reasons cause the difficulty to obtain or ensuring the right fit or relative position of the stud and socket of the snap fasteners. One of these reasons is the possibility that the stud of the snap fastener does not occupy the place intended because the latter cannot be seen or located in spite of the so-called marking. The ordinary marking-needle flat-inserted against the surface of the stuff or cloth can only generally mark or designate the place which the stud or socket of the snap fastener belongs to.

The second of said reasons consists in the fact that a displacement of the parts of the snap fastener almost always takes place during the sewing on procedure, a drawback which cannot be avoided in most cases. Said displacement is caused by the fact that as the snap fastener is held by hand on the stuff or cloth, the needle is generally first passed through one of the holes of the snap fastener which are situated near the outer edge of the latter. Consequently, the drawing of a thread into and through one of said holes is by no means sufficient for the fixation of the position of the stud or socket of the fastener. As the fastener element must be released for the reason that the finger covers the other holes provided on the edge of the mentioned parts. Therefore, a passage of the needle through said holes without in any way changing the position of the finger is not possible. In most cases therefore, said fastener element is, after being released, subject to an oscillating movement round that point as center on which it is held by the thread-stitch, and thus displaces itself on the stuff or cloth surface and assumes or takes therefore a wrong position, whereby it is neither situated on the place intended or desired nor agrees with its opposed fastener element when the layers of the stuff or cloth are placed one above another.

Now, the present invention has for its object to prevent or remove the drawbacks mentioned above, in other words to obtain or ensure a fully right fit of the two fastener elements in such a manner that the latter are precisely placed on the point intended in advance during the marking-procedure and, besides this to render, a displacement of the fastener element on the stuff or cloth impossible during the sewing on operation.

Said advantages are obtained by providing a central opening within the middle-head of the socket and stud in such a manner that a needle can be passed through each of the parts mentioned.

Whereas, during the so-called marking-procedure the needles were put flat into the stuff or cloth and therefore it was possible to mark only in a very general way the place of the fastener to be sewn on, the marking-needles are now vertically passed through the stuff or cloth as the result of the use of the fastener arranged according to the present invention.

It will be evident without any difficulty that the place selected for the center of the fastener cannot be marked in any more precise manner than by a needle vertically passed through the stuff or cloth. Now, therefore, the arrangement of a central opening in each part of the fastener allows the stud or socket to be easily placed on the needle and to unerringly ensure thereby the right position of said stud and socket which, besides this, is absolutely protected or ensured against any displacement. The needle can simultaneously be used or serve as a means or implement for sewing on the stud or socket of the fastener.

Figure 2:
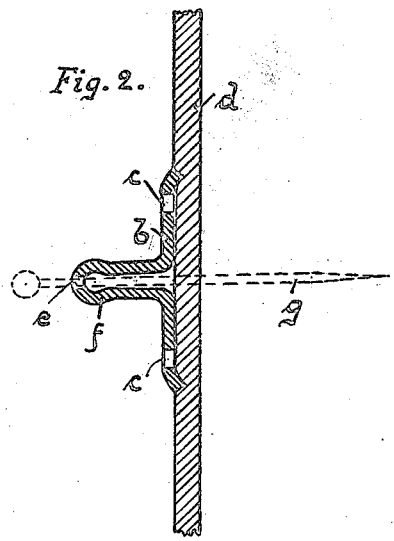
Figure 3:
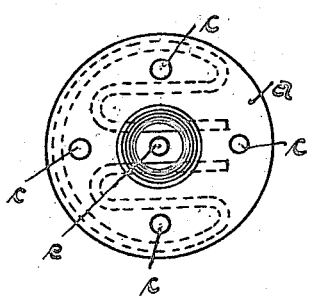
Figure 4:
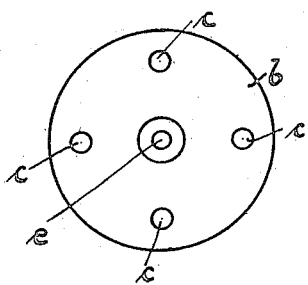

The drawing annexed to the description represents the object of the present invention. Figs. 1 and 2 show the fastener in section and Figs. 3 and 4 in elevation.

*a* is the socket and *b* the stud of the fastener. Both parts are of a well known arrangement and shape and are fastened on the edge *d* of the stuff or cloth by holes *c* situated near the periphery of the socket and stud.

Now, according to the present invention, each of both fastener elements is provided with a central opening *e* arranged within the apex or upper extremity of the heads *f* of the parts mentioned. *g* are needles represented in Figs. 1 and 2 in dotted lines. They are vertically passed through the stuff or cloth *d* in such a manner that the socket *a* and stud *b* of the fastener are brought or placed into the right position by sliding or putting the fastener elements onto said needles passed through the central openings *e* provided in the stud and socket of the fastener.

It will be observed from the foregoing description that the snap fastener comprises a pair of co-operating members, each of which has a centralizing aperture, these apertures being adapted to coincide when the two snap fastener members or elements are arranged in co-operating position and that the needle or penetrating means is adapted to be temporarily introduced through these apertures in the fastener elements when one of said elements has been arranged in a desired position to determine the proper location at which its co-acting member or element must be held during attachment. The fastener elements are, consequently, formed with corresponding, coinciding apertures for obtaining registry of the parts, the needle being adapted to be introduced through said apertures for the purposes described. The location of the aperture in the stud member is preferably the terminus thereof, whereas the button which is constituted as the socket or female element has a central aperture coinciding in area and position with that of the stud. The method of using the snap fasteners consists generally in applying one element of the fastener to a piece of cloth in substantially the position which said element will retain when in use, then laying against said element the piece of cloth which is to carry the other element of the fastener and then introducing through the center of the first named element a needle which indicates on the juxtaposed piece of cloth the proper centralized position at which the second element of the fastener is to be attached to said cloth. This second element is then finally stitched or otherwise fastened in the position indicated for it by the needle which centrally penetrates the element and thereby defines its position. Either the male member or the female member may be first stitched to one of the two pieces of cloth in a permanent manner before the central aperture thereof is used to indicate the position of the co-operating fastener element. When the male member is the first one to be thus permanently affixed, the female member is then merely placed on the male member in the same position in which the two elements function together in use, whereupon the second piece of cloth which is to carry the female member is brought to the proper position and the needle is then passed through the two central openings of the two fastener elements and into the second piece of cloth at exactly the proper point at which the female element is to be fastened permanently thereto. A female fastener element is then permanently sewed to the point thus indicated. When the first fastener element to be permanently attached to one of the pieces of cloth is the female element, the process is merely reversed.

I claim:

1. A snap fastener element comprising a flange centrally open and circumferentially apertured for attachment to cloth by means of stitching and a member centrally located with respect to said apertures and projecting out of the plane of said flange and shaped for co-operative engagement with a corresponding fastener element of opposed sex, said projecting member being provided at its central point with an opening slightly larger in diameter than the thickness of a needle, and a free passage adapted for penetration by a needle between said opening and the flange and entirely through said projecting member.

2. A garment fastening device comprising a male and a female element, each having a flange centrally located with respect to said apertures and projecting out of the plane of said flange and shaped for co-operative engagement with its corresponding fastener element, said projecting member being provided at its central point with an opening slightly larger in diameter than the thickness of a needle, and a free passage adapted for penetration by a needle between said opening and the flange and entirely through said projecting member.

3. In means of the class described, the combination with a pair of co-operating members each having a centralizing aperture, said apertures being adapted to coincide when said members are arranged in co-operating position, of penetrating means adapted to be temporarily introduced through said apertures when one of the members has been arranged in a desired position to determine the proper location at which its coacting member must be held during attachment.

4. In means of the class described, the combination with co-operating elements, one of which consists of a headed member and the other a socket member adapted to receive said headed member, said members being formed with corresponding coinciding apertures for obtaining registry of the parts, of a penetrating member adapted to be introduced through said apertures when one of the members has been attached to determine the proper relative position of and hold the other member during fastening in place, each of said members being provided with openings to receive the fastening means.

5. As a new article of manufacture, a snap fastener, consisting of co-operating members comprising a stud, the terminus of which is formed with a restricted aperture, and a button provided with a socket element to receive the stud and with a central aperture in said socket element coinciding in area and position with the aperture of the stud.

6. In the art of dress making, the method of alining of the respective members of ball and socket fasteners which consists in applying to a piece of cloth one element of said fasteners in substantially the position which said element will retain when in use, laying against said element the piece of cloth which is to carry the other element of said fastener, and then introducing through the center of the first named element a member adapted to engage the juxtaposed piece of cloth whereby to indicate on the latter the proper centralized position at which the second element of the ball and socket fastener is to be attached to said cloth for proper centralization with respect to the first named element preliminary to being permanently applied to the said juxtaposed piece of cloth.

7. In the art of dress making, the method of alining the respective members of ball and socket fasteners which consists in applying to a piece of cloth one element of said fasteners, introducing through a centralizing opening a member adapted to penetrate and thereby mark a piece of cloth which is to carry the other element of said fastener when said last named piece of cloth is juxtaposed with respect to the first mentioned fastener element, thus denoting the proper centralized position on the juxtaposed piece of cloth at which the co-operating member of the ball and socket fastener must be secured to obtain the proper relative co-operative position of said ball and socket fastener members.

8. In the art of dress making, the method of alining the respective members of ball and socket fasteners which consists first in applying permanently to a piece of cloth the male member of such ball and socket fastener, disposing the female member thereon in operative position, then juxtaposing a second piece of cloth which is to carry the female member permanently in the position which said cloth will assume when the members of the fastener are properly secured together and to their respective pieces of cloth, then passing through centralizing openings formed in the male and female members, a penetrating member whereby to engage the juxtaposed second piece of cloth at a point in alinement with the center of the female member, thereby denoting upon the juxtaposed cloth the proper centralized point at which the female member must be secured to such cloth, and finally stitching or otherwise fastening the female member in place at the indicated position.

In testimony, that I claim the foregoing as my invention, I have signed my name in presence of two witnesses, this ninth day of August, 1921.

EMIL AUGUST BAIL.

Witnesses:
FRANZ WINGRICH.
ADOLF KENDIG.